(12) United States Patent
Weber

(10) Patent No.: US 7,240,782 B2
(45) Date of Patent: Jul. 10, 2007

(54) DEVICE AND METHOD FOR FEEDING A BOLT-LIKE ELEMENT TO A PROCESSING UNIT

(75) Inventor: Gotthard Weber, Regensburg (DE)

(73) Assignee: Richard Bergner Verbindungstechnik GmbH & Co. KG, Schwabach (DE)

( * ) Notice: Subject to any disclaimer, the term of this patent is extended or adjusted under 35 U.S.C. 154(b) by 0 days.

(21) Appl. No.: 11/178,771

(22) Filed: Jul. 11, 2005

(65) Prior Publication Data

US 2005/0271493 A1 Dec. 8, 2005

Related U.S. Application Data

(63) Continuation of application No. PCT/EP03/12937, filed on Nov. 19, 2003.

(30) Foreign Application Priority Data

Jan. 10, 2003 (DE) ................ 103 00 878

(51) Int. Cl.
B65G 47/24 (2006.01)
(52) U.S. Cl. ............. 198/396; 198/466.1; 198/530
(58) Field of Classification Search ............ 198/396, 198/466.1, 443, 530, 531, 532
See application file for complete search history.

(56) References Cited

U.S. PATENT DOCUMENTS

| 4,407,402 | A | * | 10/1983 | Nishimura et al. ......... 198/389 |
| 4,609,134 | A | | 9/1986 | Davern |
| 5,619,788 | A | | 4/1997 | Schmidt |
| 5,636,725 | A | * | 6/1997 | Saito et al. ................. 198/396 |
| 6,332,529 | B1 | * | 12/2001 | Kaishita et al. .......... 198/463.4 |
| 6,443,669 | B2 | * | 9/2002 | Saito ......................... 198/396 |

FOREIGN PATENT DOCUMENTS

| DE | 39 37 903 A1 | 5/1991 |
| DE | 102 08 935 A1 | 9/2003 |
| EP | 0 587 916 A1 | 3/1994 |
| EP | 0 771 245 B1 | 5/1997 |
| GB | 2 152 862 A | 8/1985 |

* cited by examiner

*Primary Examiner*—James R. Bidwell
(74) *Attorney, Agent, or Firm*—Laurence A. Greenberg; Werner H. Stemer; Ralph E. Locher

(57) ABSTRACT

A device for feeding a bolt-shaped element having a head and a shank to a processing unit, in particular for feeding a screw to a die head of a press. The bolt-shaped element can be fed along a firing direction of the device and the latter has a conveyer channel, which is configured to line up several bolt-shaped elements and to transport them to the processing unit. The device is equipped with a receiving hopper that tapers in the firing direction. The hopper is configured to receive shaft-end of the bolt-shaped element first and is formed of several hopper segments. One of the hopper segments is formed by a feed element that can be displaced in order to transport the bolt-shaped fixing elements in a linear manner and at least another of which is formed by a blocking element that protrudes into the conveyer channel.

9 Claims, 3 Drawing Sheets

DEVICE AND METHOD FOR FEEDING A BOLT-LIKE ELEMENT TO A PROCESSING UNIT

CROSS-REFERENCE TO RELATED APPLICATION

This is a continuing application, under 35 U.S.C. § 120, of copending international application No. PCT/EP2003/012937, filed Nov. 19, 2003, which designated the United States; this application also claims the priority, under 35 U.S.C. § 119, of German patent application No. 103 00 878.0, filed Jan. 10, 2003; the prior applications are herewith incorporated by reference in their entirety.

BACKGROUND OF THE INVENTION

Field of the Invention

The invention relates to a device for feeding a bolt-shaped element with a head and a shaft to a processing unit, particularly for feeding a screw to a setting head of a press. The bolt-shaped element is feedable to the device along a shooting direction and the device contains a conveyor channel for lining up several bolt-shaped elements and conveys them to the processing unit.

Fastening elements such as screws are frequently fed by machine to a processing machine or a processing unit in a processing machine. For instance, German patent DE 30 04 549 C2 describes an infeed mechanism for discontinuously and incrementally feeding one or more elongated work pieces along a defined path to one or more processing machines, for instance shearing machines, punching machines, joining machines, embossing machines, pressing or stamping machines, boring machines and/or welding machines. The work piece is fed to the processing machine longitudinally. The device is therefore unsuitable for a processing machine such as a press that is configured for transverse loading of work pieces such as screws or bolts.

European patent EP 0 771 245 B1 (corresponding to U.S. Pat. No. 5,619,788) describes a device for feeding bolt-shaped elements into a press transversely. Here, a bolt-shaped element is received in a loading bush that is displaceable in multiple directions. The device is therefore very expensive to construct. Furthermore, the delivery rate of the device, i.e. the cycle rate, is limited by the fact that each individual bolt-shaped element is conveyed by the loading bush which moves along multiple axes.

SUMMARY OF THE INVENTION

It is accordingly an object of the invention to provide a device and a method for feeding a bolt-shaped element to a processing unit which overcome the above-mentioned disadvantages of the prior art devices and methods of this general type, which is able to feed a bolt-shaped element, particularly a screw, to a processing unit at a particularly high cycle rate without complicated constructional measures.

With the foregoing and other objects in view there is provided, in accordance with the invention, a device for feeding a bolt-shaped element having a head and a shaft to a processing unit of a press. The bolt-shaped element is feedable to the processing unit along a shooting direction. The device contains a conveyor channel for lining up several bolt-shaped elements and conveying the bolt-shaped elements to the processing unit, and a receiving funnel tapering in the shooting direction and receiving the bolt-shaped elements at a shaft-end first. The receiving funnel contains funnel segments. One of the funnel segments is formed as a forward feed element displaceable for conveying the bolt-shaped element linearly, and another of the funnel segments is formed as a blocking element that engages the conveyor channel.

The device contains a receiving funnel that tapers in a shooting direction relative to the shooting of the bolt-shaped element into the device, which is formed by a forward feed element on one side and at least one, preferably two, blocking elements on the other side. The receiving funnel is located in a conveyor channel through which the bolt-shaped element is conveyable to a processing unit, and it is provided for receiving the bolt-shaped element with the shaft-end first. The bolt-shaped element can thus be shot directly into the conveyor channel, which is preferably constructed as a guide rail, without "threading." The forward feed element can be engaged linearly without any redirection of motion in a constructionally simple fashion.

It is beneficial with respect to achieving a high cycle rate that the receiving of the bolt-shaped element does not require a feeding bush that is movable inside the device. The bolt-shaped element is therefore shot shaft-end first directly into the receiving funnel that is disposed in the conveyor channel. The term "receiving funnel" does not necessarily mean that it takes the shape strictly of a truncated cone. Rather, the receiving funnel can also have a stepped structure, particularly depending on the shape of the screw head. In any case, the funnel has a thicker region for receiving the head and a thinner region for receiving the shaft.

According to a preferred development, the blocking element or elements can be actuated directly by the forward feed element. The displacement of the blocking element from the conveyor channel with the promotion of the next bolt-shaped element in the receiving funnel thus does not occur by the bolt-shaped element. The element, particularly its thread in the case of a screw, is thus treated gently despite the high cycle rate. A high cycle rate is also facilitated by the fact that the device has only a small number of moving parts with a low overall mass, particularly compared to a screw feeder with a loading bush.

The shooting direction in which the bolt-shaped element is inserted into the device is at least approximately perpendicular to the direction in which the element is conveyed out of the receiving funnel. For guiding the bolt-shaped element in the conveyor channel, a T-slot is provided, in which the head of the element is displaceably held. Several bolt-shaped elements are typically led in the conveyor channel in immediate succession. Led by the head, the individual elements are unavoidably transported to the processing unit in the correct position.

Other features which are considered as characteristic for the invention are set forth in the appended claims.

Although the invention is illustrated and described herein as embodied in a device and a method for feeding a bolt-shaped element to a processing unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
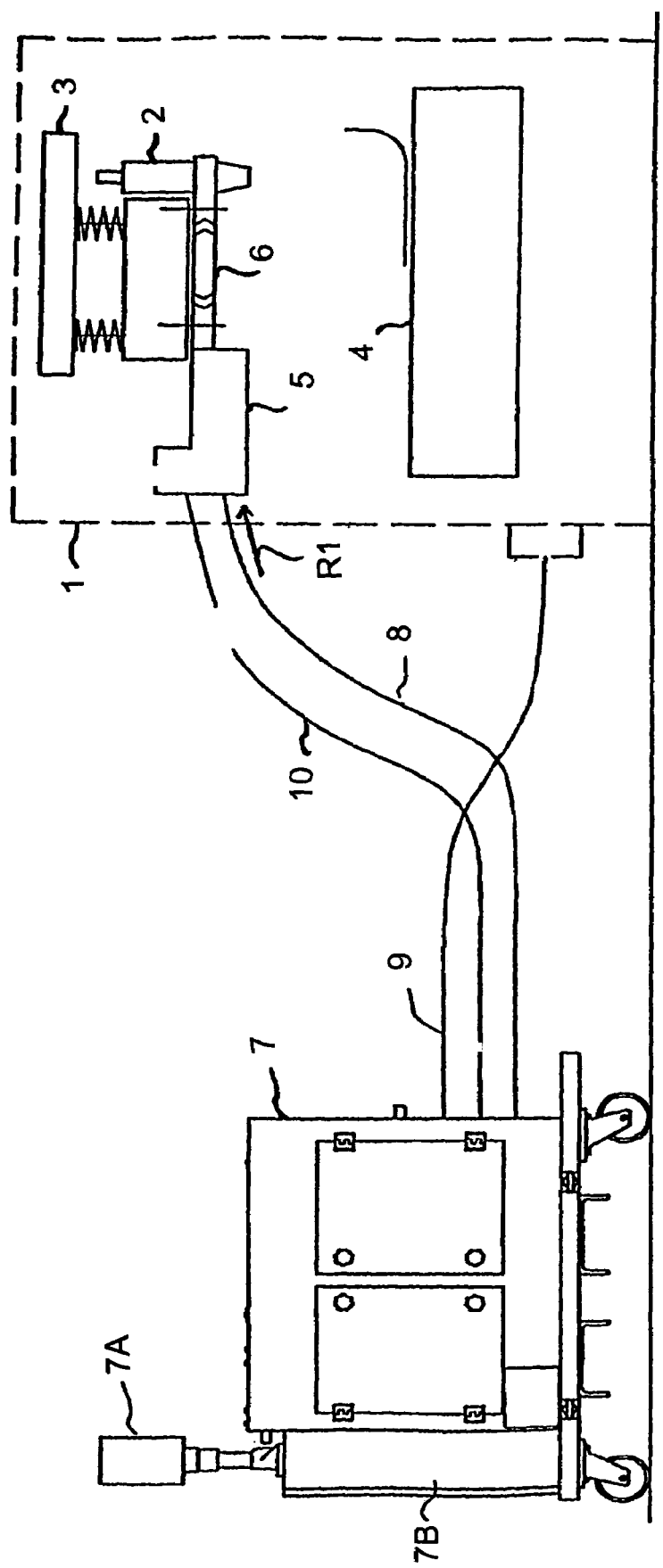
FIG. 1 is a diagrammatic, illustration of a press with a setting head as a processing unit and a feeder for bolt-shaped elements according to the invention.

In all the figures of the drawing, sub-features and integral parts that correspond to one another bear the same reference symbol in each case. Referring now to the figures of the drawing in detail and first, particularly, to FIG. 1 thereof, there is shown a processing machine in the form of a press 1 with a setting head 2 which is constructed as what is known as a setting module. The press 1 contains a top tool part 3 and a bottom tool part 4 to which a feeder 5 is connected as the device for feeding non-illustrated bolt-shaped elements having a head, particularly screws. The feeder 5 leads the bolt-shaped elements to the setting head 2 by way of a variable connecting module 6. The connecting module 6 is formed by individual modular subsections, so that different lengths can be easily set in order to allow the feeder 5 to be used in different processing machines. The feeder 5 contains a conveyor channel 11 (see FIGS. 2A to 2C) for conveying the screws to the setting head 2. During operation the bolt-shaped elements are lined up directly adjacent one another with a defined orientation in the conveyor channel 11, also known as the conveyor path or collecting path, and fed forward by the feeder 5 to the setting head 2 in cycles.

The bolt-shaped elements are shot pneumatically into the feeder 5 in direction R1 from a sorting and feeding device 7 by way of an infeed tube 8 that is connected to the feeder 5. A rigid feeding channel can also be provided instead of a tube. The sorting and feeding device 7, which contains a vibration conveyor, for example, and the press 1 are also connected by way of a signal line 9 and a punch head control line 10. Allocated to the feeding device 7 are operating unit 7A and, a control unit 7B which serves for controlling the operating process and particularly the synchronization between the sorting and feeding device 7, the feeder 5, and the cycling of the press 1.

Figure 2A:
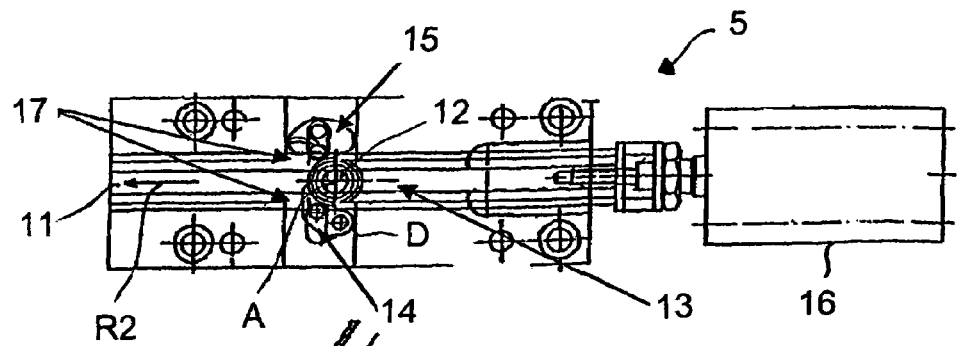
FIGS. 2A–2C are diagrammatic, sectional views of the feeder shown in FIG. 1.
Figure 2B:
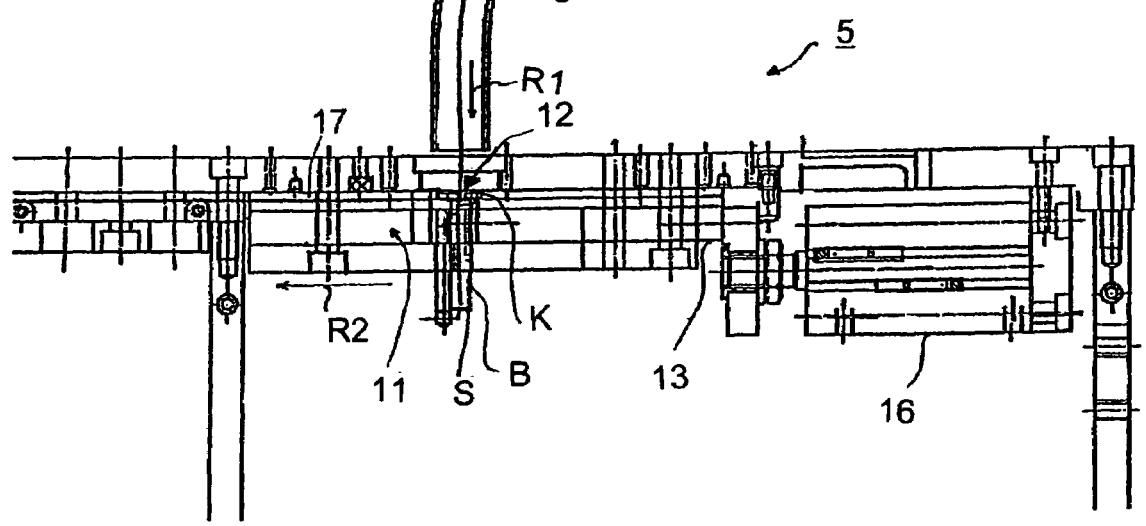
Figure 2C:
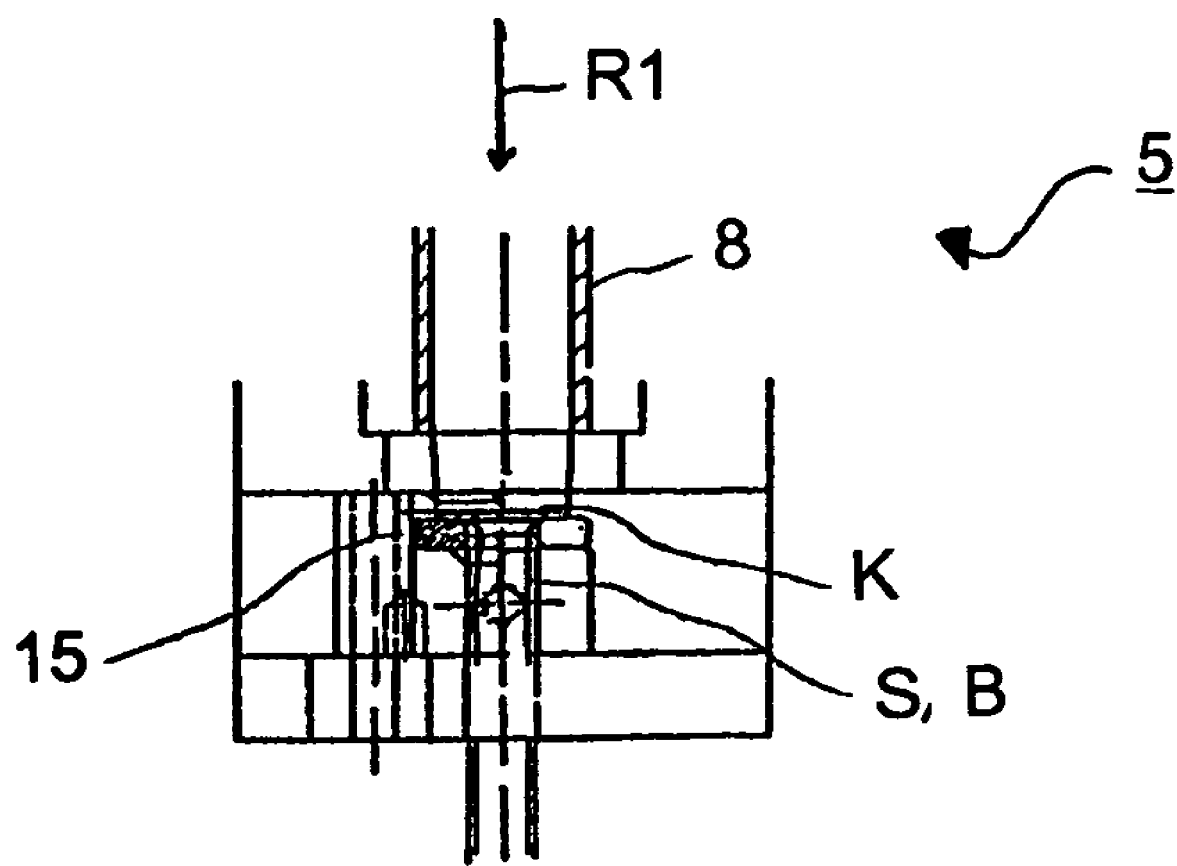

FIGS. 2A to 2C represent the feeder 5, to which, as the bolt-shaped elements, a number of screws S containing a head K and a shaft B are successively fed shaft-end first via the feeder tube 8. In the sectional view according to FIG. 2A, the shooting direction R1 is perpendicular to the plane of view. The screw S is fed to a receiving funnel 12 that tapers in shooting direction R1 which is disposed in the conveyor channel 11 and which is formed by a forward feed element 13 on one side and two blocking elements 14, 15 on the other side. The forward feed element 13 is activatable by a lifting cylinder 16 and so conveyable in a transverse direction R2 perpendicular to the direction of shooting R1, whereby the head K of the screw S is led in a T-slot 17 in the conveyor channel 11, which is constructed as a conveyor rail.

Approximately half of the receiving funnel 12 is formed by the forward feed element 13, and one-fourth is formed by each of the blocking elements 14, 15 respectively. FIG. 2A represents the blocking element 14 at the bottom in the closed position and the blocking element 15 on the top in the open position. In the actual operation of the feeder 5, either both blocking elements 14, 15 are closed and consequently the receiving funnel 12 is closed, or both blocking elements 14, 15 are open. The receiving funnel 12 is initially closed during the shooting of a screw S into the feeder 5. The screw S is stopped in the receiving funnel 12 with its head K.

Next the forward feed element 13 moves to the left in relation to the configuration according to FIG. 2A. The blocking elements 14, 15, also referred to as latches, are actuated, i.e. opened, directly by the forward feed element 13, so that the screw S can be promoted in the conveyor channel 11. The blocking elements 14, 15 are pivotable about respective axes D, which are disposed outside the conveyor channel 11 and behind the axis A of the receiving funnel 12 relative to the transverse direction R2. This configuration of the axes of rotation D relative to the receiving funnel 12 makes it possible for the blocking elements 14, 15 to be opened easily and rapidly by the forward feed element 13 making direct contact with them during forward conveyance. Force is not exerted between the screw S and the blocking elements 14, 15 during conveyance. During the subsequent reverse motion of the forward feed element 13, the blocking elements 14, 15 are moved toward one another again by resilient force, closing the receiving funnel again 12. The further conveyance of the screw in the feeder 5 thus requires only a single actively mobile element, namely the forward feed element 13 that is driven linearly directly by the lift cylinder 16. The feeder 5 is thus constructionally simple and compact as a whole notwithstanding its ability to achieve a high cycle rate.

I claim:

1. A device for feeding a bolt-shaped element having a head and a shaft to a processing unit of a press, the bolt-shaped element being feedable to the processing unit along a shooting direction, the device comprising:
    a conveyor channel for lining up several bolt-shaped elements and conveying the bolt-shaped elements to the processing unit; and
    a receiving funnel tapering in the shooting direction and receiving the bolt-shaped elements at a shaft-end first, said receiving funnel containing funnel segments, one of said funnel segments formed as a forward feed element displaceable for conveying the bolt-shaped element linearly, said forward feed element being provided for direct actuation of said blocking element, and another of said funnel segments formed as a blocking element that engages said conveyor channel.

2. The device according to claim 1, wherein said blocking element is held in said conveyor channel by a resilient force.

3. The device according to claim 1, further comprising a lifting cylinder for linearly actuating said forward feed element.

4. The device according to claim 1, wherein said conveyor channel has a T-shaped slot formed therein for guiding the head of the bolt-shaped elements.

5. The device according to claim 1, wherein the device feeds a screw to a setting head of the press.

6. A method for feeding a bolt-shaped element with a head and a shaft to a processing unit of a press, which comprises the steps of:
    providing the device according to claim 1;
    lining up several bolt-shaped elements in a conveyor channel and conveying the bolt-shaped elements to the processing unit by shooting the bolt-shaped elements from a feeding device directly into the conveyor channel with the shaft of the bolt-shaped elements entering the conveyor channel first.

7. The method according to claim 6, which further comprises using screws as the bolt-shaped elements.

8. A device for feeding a bolt-shaped element having a head and a shaft to a processing unit of a press, the bolt-shaped element being feedable to the processing unit along a shooting direction, the device comprising:
- a conveyor channel for lining up several bolt-shaped elements and conveying the bolt-shaped elements to the processing unit; and
- a receiving funnel tapering in the shooting direction and receiving the bolt-shaped elements at a shaft-end first, said receiving funnel containing funnel segments, one of said funnel segments formed as a forward feed element displaceable for conveying the bolt-shaped element linearly, said forward feed element forming at least approximately half of said receiving funnel, and another of said funnel segments formed as a blocking element that engages said conveyor channel.

9. A device for feeding a bolt-shaped element having a head and a shaft to a processing unit of a press, the bolt-shaped element being feedable to the processing unit along a shooting direction, the device comprising:
- a conveyor channel for lining up several bolt-shaped elements and conveying the bolt-shaped elements to the processing unit; and
- a receiving funnel tapering in the shooting direction and receiving the bolt-shaped elements at a shaft-end first, said receiving funnel containing funnel segments, one of said funnel segments formed as a forward feed element displaceable for conveying the bolt-shaped element linearly, and another of said funnel segments formed as a blocking element that engages said conveyor channel, said blocking element being one of two blocking elements, and each of said two blocking elements forming at least approximately one-fourth of said receiving funnel respectively.

* * * * *